(12) United States Patent
Ikeda

(10) Patent No.: US 8,446,814 B2
(45) Date of Patent: May 21, 2013

(54) RADIO COMMUNICATION SYSTEM, RADIO COMMUNICATION DEVICE, RADIO COMMUNICATION METHOD, AND PROGRAM

(75) Inventor: Tetsu Ikeda, Tokyo (JP)

(73) Assignee: NEC Corporation, Tokyo (JP)

( * ) Notice: Subject to any disclaimer, the term of this patent is extended or adjusted under 35 U.S.C. 154(b) by 300 days.

(21) Appl. No.: 12/934,043

(22) PCT Filed: Apr. 2, 2009

(86) PCT No.: PCT/JP2009/056860
§ 371 (c)(1),
(2), (4) Date: Sep. 22, 2010

(87) PCT Pub. No.: WO2009/125708
PCT Pub. Date: Oct. 15, 2009

(65) Prior Publication Data
US 2011/0044161 A1    Feb. 24, 2011

(30) Foreign Application Priority Data

Apr. 8, 2008  (JP) ................................. 2008-100426

(51) Int. Cl.
*H04J 11/00* (2006.01)
*H04B 7/005* (2006.01)
*H04B 7/14* (2006.01)
*H04Q 7/20* (2006.01)

(52) U.S. Cl.
USPC ........... 370/210; 370/203; 370/278; 370/311; 370/315; 455/422.1

(58) Field of Classification Search
USPC ...... 370/328, 329, 335, 336, 200–315; 455/9, 455/11.1, 422.1; 375/295, 248
See application file for complete search history.

(56) References Cited

U.S. PATENT DOCUMENTS

| 7,952,988 | B2 * | 5/2011 | Lee et al. ...................... 370/208 |
| 2005/0099936 | A1 * | 5/2005 | Fujii et al. ..................... 370/203 |
| 2007/0127361 | A1 | 6/2007 | Kasami et al. |
| 2007/0159959 | A1 | 7/2007 | Song et al. |
| 2007/0211661 | A1 | 9/2007 | Tee et al. |
| 2008/0293398 | A1 * | 11/2008 | Seyama et al. ............. 455/422.1 |
| 2010/0226290 | A1 * | 9/2010 | Kwak et al. ................... 370/278 |
| 2012/0093257 | A1 | 4/2012 | Sawahashi |

FOREIGN PATENT DOCUMENTS

| JP | 9-512156 A | 12/1997 |
| JP | 2000216752 A | 8/2000 |
| JP | 2002261728 A | 9/2002 |
| JP | 2005110014 A | 4/2005 |

(Continued)

OTHER PUBLICATIONS

International Search Report for PCT/JP2009/056860 mailed May 19, 2009.

(Continued)

*Primary Examiner* — Afsar M Qureshi

(57) ABSTRACT

A radio communication system according to the present invention has a plurality of radio communication devices that transmit and receive subframes one by one. Each of the plurality of radio communication devices includes a subframe generation unit that generates the subframe with a plurality of symbols and causes an effective symbol length of a last symbol of the subframe to be $1/X$ (where X is an integer equal to or greater than 2) and a transmission unit that transmits the subframe to another radio communication device.

9 Claims, 3 Drawing Sheets

FOREIGN PATENT DOCUMENTS

| | | |
|---|---|---|
| JP | 2005150850 A | 6/2005 |
| JP | 2005303826 A | 10/2005 |
| JP | 2006352379 A | 12/2006 |
| TW | 200737796 | 10/2007 |

OTHER PUBLICATIONS

Japanese Office Action for JP2010-507222 mailed on Nov. 13, 2012.
Taiwanese Office Action for TW098111664 mailed on Oct. 18, 2012.

\* cited by examiner

RADIO COMMUNICATION SYSTEM, RADIO COMMUNICATION DEVICE, RADIO COMMUNICATION METHOD, AND PROGRAM

The present application is the National Phase of PCT/JP2009/056860, filed Apr. 2, 2009, which claims priority based on JP 2008-100426 filed on Apr. 8, 2008, and incorporates herein the entire disclosure thereof by reference.

TECHNICAL FIELD

The present invention relates to a radio communication system, a radio communication device, a radio communication method, and a program.

BACKGROUND ART

In recent years, radio communication systems of OFDM (Orthogonal Frequency Division Multiplexing) system and OFDMA (Orthogonal Frequency Division Multiple Access) system in which data are allocated to a plurality of subcarriers have gained attention. Among them, the OFDMA system has been used, for example, for WiMAX (Worldwide Interoperability for Microwave Access).

In the OFDM system and the OFDMA system, the transmission side transforms a signal containing data to be transmitted as a frequency domain signal into a time domain signal using IFFT (Inverse Fast Fourier Transform) and transmits the transformed signal. The reception side, in contrast, transforms a time domain signal received from the transmission side into a frequency domain signal using FFT (Fast Fourier Transform) and extracts the original data from the frequency domain signal.

Generally, in an OFDM symbol, a cyclic prefix (CP) that is a copy of a trailing portion of an effective symbol containing data to be transmitted is added at the beginning of the effective symbol to prevent the OFDM symbol from being adversely influenced by multi-path interference.

However, the optimum value of the CP length depends on the propagation environment.

For example, in a propagation environment where there is a large delay dispersion, it is necessary to increase the CP length. However, if the CP length is increased, since the amount of data that can be transmitted in a unit time period becomes small, it is improper to increase the CP length in a transmission environment in which a large amount of data is transmitted at high speed.

For example, patent documents 1 and 2 (JP 2005-303826 A and JP 110014 A, Respectively) disclose techniques that can vary the CP lengths of OFDM symbols.

However, in a radio communication system where data are transmitted and received as frames one by one and the frame length is constant, if the CP length is variable and a frame is composed of OFDM symbols, a time period that is shorter than the CP length and the effective symbol length may remain. In this situation, however, the remaining time period becomes an idle time period in which an OFDM symbol cannot be placed and thereby data cannot be transmitted.

Moreover, in a radio communication system where a frame is divided into a plurality of subframes and the subframe length is constant, an idle time period may take place in each subframe. Furthermore, in a radio communication system where the subframe length is variable, an idle time period may take place in a subframe. Thus, to transmit as much data as possible, it is necessary to shorten the idle time period in a frame/subframe.

Thus, in the OFDM system and the OFDMA system where the frame length is constant, even if the CP length is varied, shortening the idle time in a frame/subframe has become an important issue.

[Patent Document 1] JP 2005-303826 A
[Patent Document 2] JP 2005-110014 A

SUMMARY OF INVENTION

Therefore, an object of the present invention is to provide a radio communication system, a radio communication device, a radio communication method, and a program that can solve the foregoing issue.

A radio communication system according to the present invention is a radio communication system having a plurality of radio communication devices that transmit and receive subframes one by one, each of said plurality of radio communication devices comprising:

a subframe generation unit that generates said subframe with a plurality of symbols and causes an effective symbol length of a last symbol of said subframe to be 1/X (where X is an integer equal to or greater than 2); and a transmission unit that transmits said subframe to another radio communication device.

A radio communication device according to the present invention is a radio communication device that transmits and receives subframes one by one, comprising:

a subframe generation unit that generates said subframe with a plurality of symbols and causes an effective symbol length of a last symbol of said subframe to be 1/X (where X is an integer equal to or greater than 2); and a transmission unit that transmits said subframe to another radio communication device.

A radio communication method according to the present invention is a radio communication method of a radio communication device that transmits and receives subframes one by one, comprising steps of:

generating said subframe with a plurality of symbols and causing an effective symbol length of a last symbol of said subframe to be 1/X (where X is an integer equal to or greater than 2); and transmitting said subframe to another radio communication device.

A program according to the present invention is a program that causes a radio communication device that transmits and receives subframes one by one to execute the processes of:

generating said subframe with a plurality of symbols and causing an effective symbol length of a last symbol of said subframe to be 1/X (where X is an integer equal to or greater than 2); and transmitting said subframe to another radio communication device.

In the radio communication device according to the present invention, the effective symbol length of the last symbol of a subframe is assigned as 1/X.

Thus, even if a time period that is shorter than the cyclic prefix length and one effective symbol length remains, when the entire remaining time period needs to be prevented from becoming an idle time period, data can be transmitted such that a symbol having an effective symbol length of 1/X is placed in the time period. Consequently, the effect of shortening the idle time can be obtained.

BEST MODES FOR CARRYING OUT THE INVENTION

Hereinafter, the best modes to carry out the present invention will be described with reference to the accompanying drawings.

In an exemplary embodiment that follows, although a radio communication system will be described as a WiMAX radio communication system, the present invention is not limited thereto.

Figure 1:
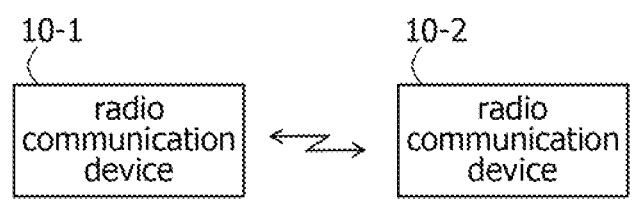
FIG. 1 is a block diagram showing the structure of a radio communication system according to an exemplary embodiment of the present invention.

FIG. 1 is a schematic diagram showing the structure of a radio communication system according to this exemplary embodiment.

As shown in FIG. 1, the radio communication system according to this, exemplary embodiment is provided with radio communication devices 10-1 and 10-2 that transmit and receive subframes one by one. In FIG. 1, for simple description, it is assumed that the number of radio communication devices is two; however, according to the present invention, the number is not limited thereto. In addition, one of radio communication devices 10-1 and 10-2 is assigned as a base station, the other being assigned as a terminal.

Hereinafter, a transmission-side structure and a reception-side structure of radio communication devices 10-1 and 10-2 will be separately described.

First of all, the transmission-side structure will be described.

Figure 2:
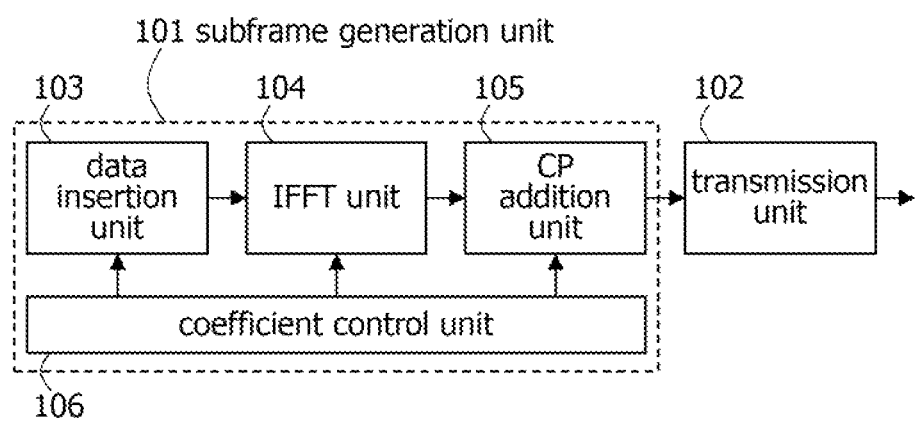
FIG. 2 is a block diagram exemplifying the structure of a transmission side of a radio communication device shown in FIG. 1.

FIG. 2 is a block diagram showing the transmission-side structure of each of radio communication devices 10-1 and 10-2.

As shown in FIG. 2, the transmission side of radio communication devices 10-1 and 10-2 is provided with subframe generation unit 101 and transmission unit 102.

Subframe generation unit 101 generates a subframe with a plurality of OFDM symbols, whereas transmission unit 102 transmits the subframe generated by subframe generation unit 101 to the other radio communication device.

At this point, although subframe generation unit 101 assigns each of OFDM symbols other than the last OFDM symbol as one effective symbol length+CP length, subframe generation unit 101 assigns the last OFDM symbol as 1/X (where X is an integer equal to or greater than 2) effective symbol length+CP length in a predetermined situation.

Figure 3:
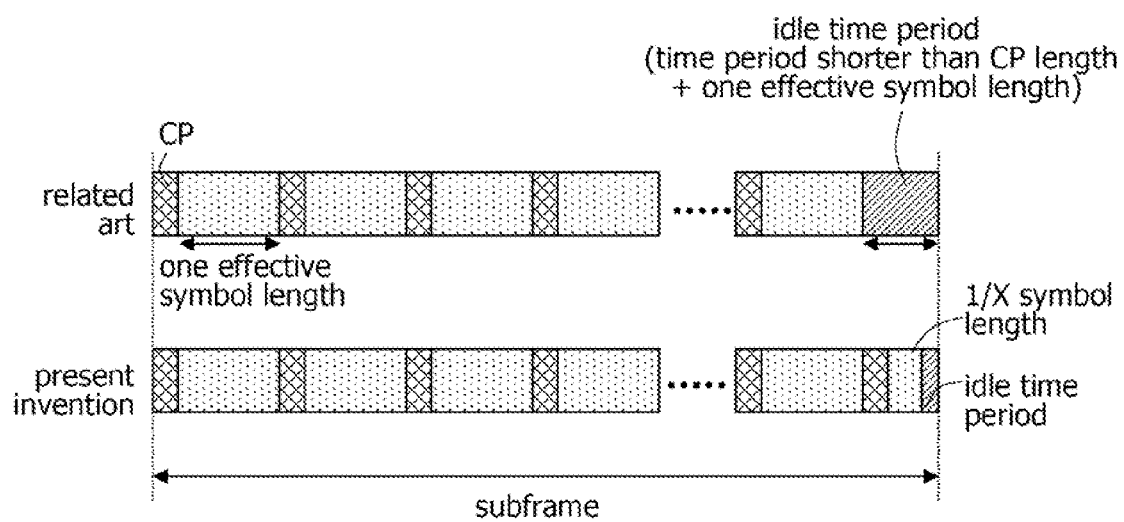
FIG. 3 is a schematic diagram exemplifying a subframe generated by the radio communication device shown in FIG. 1.

For example, as shown in FIG. 3, according to related art, if a time period that is shorter than the CP length and the one effective symbol length remains in a subframe, the entire time period became an idle time period.

In contrast, according to the present invention, to prevent the remaining time period from becoming an idle time period, the effective symbol length of the last OFDM symbol can be assigned as 1/X. Thus, even if a time period that is shorter than the CP length and the one effective symbol length remains, since data can be transmitted such that an OFDM symbol is placed in the remaining time period, the idle time period can be shortened.

However, it is not always necessary to control the effective symbol length of the last OFDM symbol to be 1/X. For example, if a time period that remains in a subframe is very short (e.g. 1/100 of one effective symbol length, etc.), the remaining time period may be left as an idle time period.

Hereinafter, the structure of subframe generation unit 101 will be described in detail.

Subframe generation unit 101 is provided with data insertion unit 103, IFFT unit 104, CP addition unit 105, and coefficient control unit 106 that serves as a first coefficient control unit.

Data insertion unit 103 generates a frequency domain signal such that pilot signal or data are placed on nY-th (where n is 1, 2, 3, . . . ; Y is an integer equal to or greater than 1) subcarriers.

IFFT unit 104 transforms the frequency domain signal generated by data insertion unit 103 into a time domain signal using inverse fast Fourier transform.

CP addition unit 105 divides by division number Y the time domain signal generated by IFFT unit 104 using inverse fast Fourier transform and adds a CP only to the first divided time domain signal. The CP added time domain signal becomes one OFDM symbol having an effective symbol length of 1/Y.

Coefficient control unit 106 controls Y for the transmission side. Specifically, coefficient control unit 106 controls Y to be 1, when each of OFDM symbols other than the last OFDM symbol is transmitted, and controls Y to be X, when the effective symbol length of the last OFDM symbol is assigned as 1/X.

Generally, if OFDM symbols are assigned as a plurality of different kinds of effective symbol lengths, the transmission side needs to provide IFFT units 104 that correspond to the kinds of effective symbol lengths.

In contrast, although the present invention has the structure using only one IFFT unit 104 as described above, since it can generate OFDM symbols having a plurality of different kinds of effective symbol lengths, it is not necessary to provide IFFT units 104 that correspond to the kinds of effective symbol lengths.

Next, the reception-side structure will be described.

Figure 4:
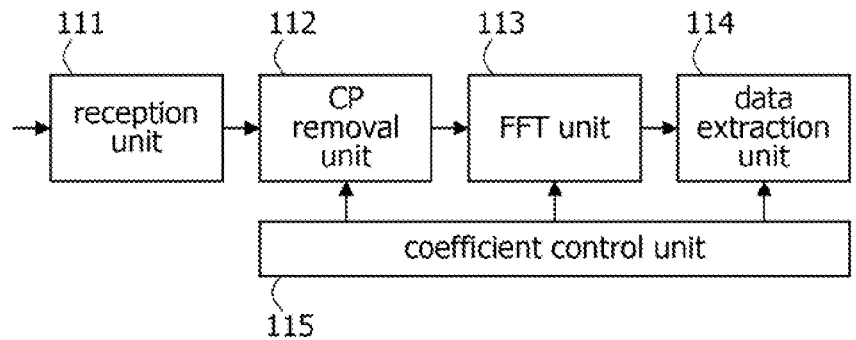
FIG. 4 is a block diagram exemplifying the structure of a reception side of the radio communication device shown in FIG. 1.

FIG. 4 is a block diagram showing the reception-side structure of each of radio communication devices 10-1 and 10-2.

As shown in FIG. 4, the reception side of each of radio communication devices 10-1 and 10-2 is provided with reception unit 111, CP removal unit 112, FFT unit 113, data extraction unit 114, and coefficient control unit 115 that serves as a second coefficient control unit.

Reception unit 111 receives a subframe from the other radio communication device.

CP removal unit 112 obtains effective symbols such that it removes CP's from OFDM symbols that compose a subframe received by reception unit 111.

FFT unit 113 transforms a time domain signal as Y repetitions of effective symbols obtained by CP removal unit 112 into a frequency domain signal using fast Fourier transform.

Data extraction unit 114 extracts pilot signals and data from nY-th subcarriers of the frequency domain signal generated using fast Fourier transform by FFT unit 113.

Coefficient control unit 115 controls Y for the reception side. Specifically, coefficient control unit 115 controls Y to be 1, when each of OFDM symbols other than the last OFDM symbol is received, and controls Y to be X, when the effective symbol length of the last OFDM symbol is assigned as 1/X.

Generally, if OFDM symbols are assigned as a plurality of different kinds of effective symbol lengths, the reception side needs to provide FFT units 113 that correspond to the kinds of effective symbol lengths.

In contrast, although the present invention has a structure that use only one FFT unit 113 as described above, since it can extract data from OFDM symbols having a plurality of different kinds of effective symbol lengths, it is not necessary to provide FFT units 113 that correspond to the types of effective symbol lengths.

According to this exemplary embodiment, the reception side needs to obtain a timing at which the transmission side has transmitted the last OFDM symbol and information such as X and Y that the transmission side has used. However, such information can be obtained in any manner. For example, a method in which such information has been set up both on the transmission side and the reception side, a method in which the transmission side informs the reception side of such information, a method in which a higher node, not shown, commands both the transmission side and the reception side to use such information, and so forth may be contemplated, but methods are not limited to these methods.

In addition, according to this exemplary embodiment, since a subcarrier used for the last OFDM symbol of a subframe is restricted, it may happen that a pilot signal necessitating demodulation of data cannot be transmitted and received. In this situation, it can be contemplated that the location of a subcarrier for a pilot signal for the last OFDM symbol has been designated. This method includes a method in which a subcarrier for a pilot signal is not allocated to the last OFDM symbol, but in which a channel estimation result of a preceding OFDM symbol is also applied to the last OFDM symbol. Data insertion unit 103 and data extraction unit 114 control pilot symbols for pilot signals to be placed on subcarriers on the basis of Y.

Hereinafter, a transmission operation and a reception operation of each of radio communication devices 10-1 and 10-2 will be separately described. In the following, it is assumed that radio communication device 10-1 is assigned as the transmission side and radio communication device 10-2 is assigned as the reception side. In addition, with an assumption that the effective symbol length of the last OFDM symbol of a subframe is assigned as 1/X, the operation of processing the last OFDM symbol will be mainly described.

First of all, the transmission operation will be described.

Figure 5:
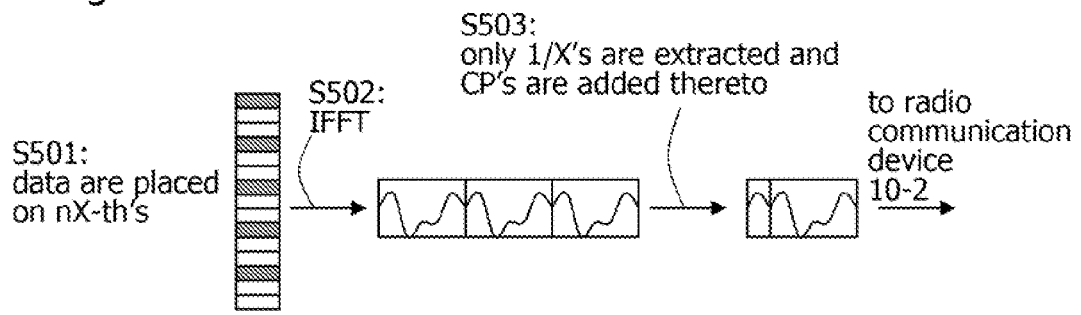
FIG. 5 is a flow chart describing an example of a transmission operation of the radio communication device shown in FIG. 1.

FIG. 5 is a schematic diagram describing the transmission operation of radio communication device 10-1. In FIG. 5, X=3 has been assigned.

When transmitting a subframe to radio communication device 10-2, first, by controlling Y to be 1, radio communication device 10-1 successively generates OFDM symbols having one effective symbol length, and finally by controlling Y to be X, it generates an OFDM symbol having an effective symbol length of 1/X.

As shown in FIG. 5, when decreasing the effective symbol length of OFDM symbols is assigned as 1/X, data insertion unit 103 generates a frequency domain signal such that pilot signals or data are placed only on 1X-th, 2X-th, 3X-th, . . . subcarriers at step S501.

Thereafter, IFFT unit 104 transforms the frequency domain signal into a time domain signal using inverse fast Fourier transform at step S502. This time domain signal becomes a periodic signal of X repetitions of the same data in time domain.

Thereafter, CP addition unit 105 divides the time domain signal by division number X and adds a CP only to the first divided time domain signal at step S503. In such a manner, the CP added time domain signal becomes an OFDM symbol having an effective symbol length of 1/X.

In such a manner, radio communication device 10-1 can generate a subframe such that the last OFDM symbol has an effective symbol length of 1/X. Thereafter, the subframe is transmitted to radio communication device 10-2 by transmission unit 102.

Next, the reception operation will be described.

Figure 6:
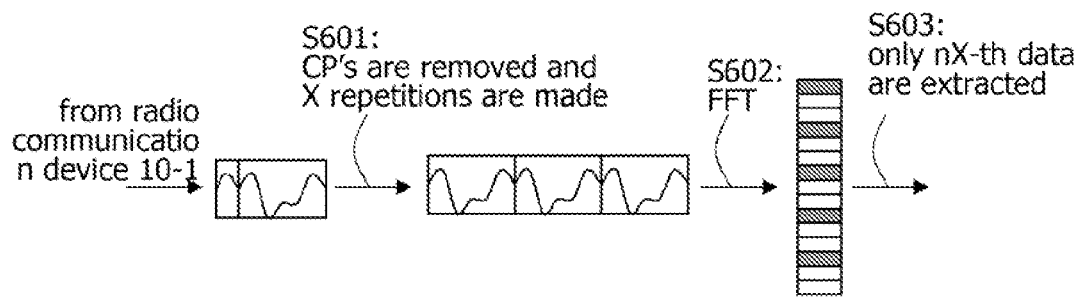
FIG. 6 is a flow chart describing an example of a transmission operation of the radio communication device shown in FIG. 1.

FIG. 6 is a schematic diagram describing the reception operation of radio communication device 10-2. In FIG. 6, X=3 has been assigned.

When receiving a subframe from radio communication device 10-1, first, by controlling Y to be 1, radio communication device 10-2 successively extracts data from OFDM symbols having one effective symbol length, then finally by controlling Y to be X, it extracts data from an OFDM symbol having an effective symbol length of 1/X.

As shown in FIG. 6, when extracting data from an OFDM symbol having an effective symbol length of 1/X, CP removal unit 112 obtain X repetitions of time domain signals such that CP removing unit 112 removes a CP from OFDM symbol having an effective symbol length of 1/X at step S601.

Thereafter, FFT unit 113 transforms the time domain signal into a frequency domain signal using fast Fourier transform at step S602.

Thereafter, data extraction unit 114 extracts pilot signals and data placed on nX-th subcarriers of the frequency domain signal at step S603.

In such a manner, radio communication device 10-2 can extract data from the last OFDM symbol having an effective symbol length of 1/X.

As described above, according to this exemplary embodiment, radio communication devices 10-1 and 10-2 assign the effective symbol length of the last OFDM symbol of a subframe as 1/X.

Thus, even if a time period that is shorter than the CP length and the one effective symbol length remains, to prevent the entire remaining time period from becoming an idle time period, since an OFDM symbol having an effective symbol lengths of 1/X can be placed in the remaining time period and the resultant data can be transmitted, the idle time period can be shortened.

Moreover, according to this exemplary embodiment, in the transmission mode, radio communication devices 10-1 and 10-2 generate OFDM symbols such that they transform a frequency domain signal in which pilot signals and data have been placed on nY-th subcarriers into a time domain signal using IFFT and add CP's to the Y-divided first time domain signals. In contrast, in the reception mode, they transform Y repetitions of time domain signals in which CP's have been removed from OFDM symbols into a frequency domain signal using FFT, and extract pilot signals and data from nY-th subcarriers of the frequency domain signal.

Even in the structure using only one IFFT unit 104 and one FFT unit 113, by controlling Y, they can handle an OFDM symbol that has an effective symbol length of 1/X as well as OFDM symbols that have one effective symbol length.

Thus, without the need to increase hardware for IFFT units 104 and FFT units 113 that correspond to the kinds of effective symbol lengths, OFDM symbols that have effective symbol lengths of 1/X can be transmitted and received.

The methods performed by radio communication devices 10-1 and 10-2 according to the present invention may be applied to a program that causes a computer to execute the methods. In addition, the program can be stored in a storage medium and provided outside through a network.

The present invention has been described above in reference to the exemplary embodiments. However, the present invention is not limited to the above exemplary embodiments. Rather, various changes that can be understood by those skilled in the art within the scope of the invention may be made to the arrangements and details of the present invention.

For example, on the transmission side, there may be a case in which the number of subcarriers cannot be divided by X depending on its value. In this case, (the total number of subcarriers)/X is calculated and the rounded-up number of the fraction of the calculated result is assigned as the number of subcarriers Nsub on which a signal is placed. In this case, it is assumed that the effective length of symbols to be transmitted is Nsub/(total number of subcarriers) instead of 1/X.

In this case, the reception side needs to perform fast Fourier transform after reproducing successive data having a symbol length through oversampling or filtering.

The invention claimed is:

1. A radio communication system having a plurality of radio communication devices that transmit and receive subframes one by one, each of said plurality of radio communication devices comprising:
   a subframe generation unit that generates a subframe with a plurality of symbols and causes an effective symbol length of a last symbol of said subframe to be 1/X (where X is an integer equal to or greater than 2); and
   a transmission unit that transmits said subframe to another radio communication device,
   wherein said subframe generation unit comprises:
   a data insertion unit that generates a frequency domain signal such that data are placed on nY-th (where n is 1, 2, 3, . . . ; Y is an integer equal to or greater than 1) subcarriers;
   an IFFT unit that transforms said frequency domain signal into a time domain signal using inverse fast Fourier transform;
   a CP addition unit that generates symbols such that said time domain signal is divided by division number Y and cyclic prefixes are added to divided first time domain signals; and
   a first coefficient control unit that controls said Y to be said X or 1.

2. The radio communication system as set forth in claim 1, wherein each of said plurality of radio communication devices further comprises:
   a reception unit that receives said subframe from another radio communication device;
   a CP removal unit that obtains a time domain signal such that cyclic prefixes are removed from symbols that compose said subframe;
   an FFT unit that transforms Y repetitions of said time domain signals into a frequency domain signal using fast Fourier transform;
   a data extraction unit that extracts data from nY-th subcarriers of said frequency domain signal; and
   a second coefficient control unit that controls said Y to be said X or 1.

3. The radio communication system as set forth in claim 2, wherein said data insertion unit and said data extraction unit control subcarriers on which pilot symbols are placed on the basis of said Y.

4. A radio communication device that transmits and receives subframes one by one, comprising:
   a subframe generation unit that generates a subframe with a plurality of symbols and causes an effective symbol length of a last symbol of said subframe to be 1/X (where X is an integer equal to or greater than 2); and
   a transmission unit that transmits said subframe to another radio communication device,
   wherein said subframe generation unit comprises:
   a data insertion unit that generates a frequency domain signal such that data are placed on nY-th (where n is 1, 2, 3, . . . ; Y is an integer equal to or greater than 1) subcarriers;
   an IFFT unit that transforms said frequency domain signal into a time domain signal using inverse fast Fourier transform;
   a CP addition unit that generates symbols such that said time domain signal is divided by division number Y and cyclic prefixes are added to divided first time domain signals; and
   a first coefficient control unit that controls said Y to be said X or 1.

5. The radio communication device as set forth in claim 4, further comprising:
   a reception unit that receives said subframe from another radio communication device;
   a CP removal unit that obtains a time domain signal such that cyclic prefixes are removed from symbols that compose said subframe;
   an FFT unit that transforms Y repetitions of said time domain signals into a frequency domain signal using fast Fourier transform;
   a data extraction unit that extracts data from nY-th subcarriers of said frequency domain signal; and
   a second coefficient control unit that controls said Y to be said X or 1.

6. The radio communication device as set forth in claim 5, wherein said data insertion unit and said data extraction unit control subcarriers on which pilot symbols are placed on the basis of said Y.

7. A radio communication method of a radio communication device that transmits and receives subframes one by one, comprising steps of:
   generating a subframe with a plurality of symbols and causing an effective symbol length of a last symbol of said subframe to be 1/X (where X is an integer equal to or greater than 2); and
   transmitting said subframe to another radio communication device,
   wherein the step of generating said subframe is performed by:
   controlling Y to be said X or 1;
   generating a frequency domain signal such that data are placed on nY-th (where n is 1, 2, 3, . . .) subcarriers;
   transforming said frequency domain signal into a time domain signal using inverse fast Fourier transform;
   generating symbols such that said time domain signal is divided by division number Y and cyclic prefixes are added to divided first time domain signals.

8. The radio communication method as set forth in claim 7, further comprising the steps of:
   receiving said subframe from another radio communication device;
   controlling said Y to be said X or 1;
   obtaining a time domain signal such that cyclic prefixes are removed from symbols that compose said subframe;
   transforming Y repetitions of said time domain signals into a frequency domain signal using fast Fourier transform; and
   extracting data from nY-th subcarriers of said frequency domain signal.

9. The radio communication method as set forth in claim 8, further comprising the step of:
   controlling subcarriers on which pilot symbols are placed on the basis of said Y.

* * * * *